Jan. 20, 1925.

J. S. LANG

AXLE CLAMP

Filed Aug. 4, 1921

INVENTOR:
James S. Lang
By Coale Hayms
ATTORNEYS

Jan. 20, 1925.  1,523,597
J. S. LANG
AXLE CLAMP
Filed Aug. 4, 1921    2 Sheets-Sheet 2
Fig. 3.
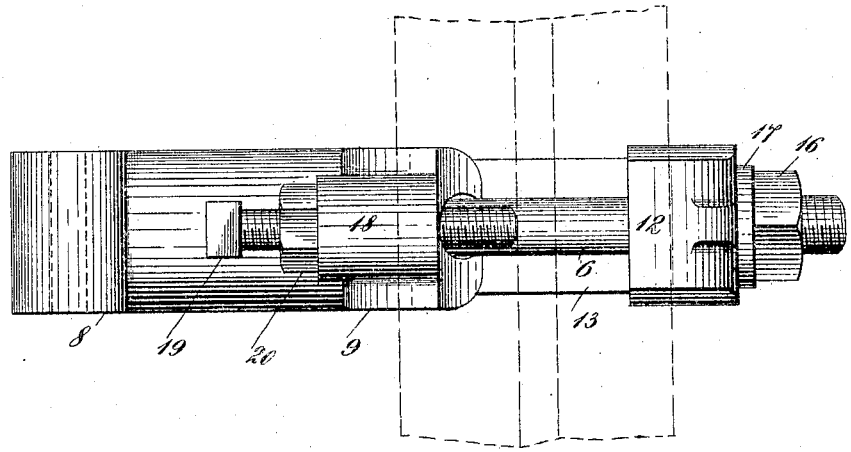
Fig. 4.
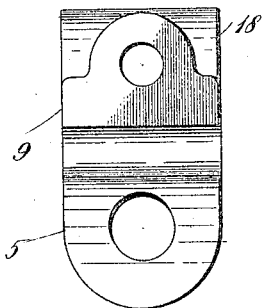
Fig. 5.
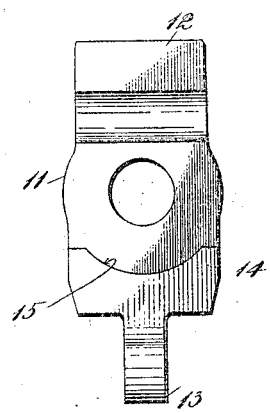
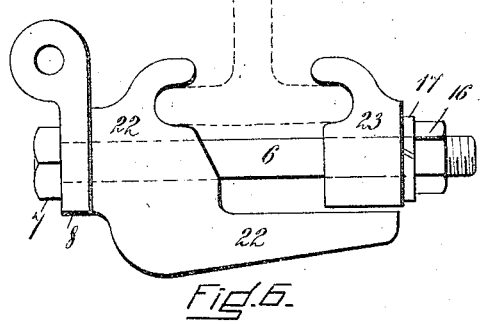
Fig. 6.
INVENTOR=
James S. Lang
BY
ATTORNEYS:

Patented Jan. 20, 1925.

1,523,597

UNITED STATES PATENT OFFICE.

JAMES S. LANG, OF WATERTOWN, MASSACHUSETTS.

AXLE CLAMP.

Application filed August 4, 1921. Serial No. 489,913.

*To all whom it may concern:*

Be it known that I, JAMES S. LANG, of Watertown, in the county of Middlesex and State of Massachusetts, a citizen of the United States, have invented a new and useful Improvement in Axle Clamps, of which the following is a full, clear, and exact description, reference being had to the accompanying drawings, forming a part of this specification in explaining its nature.

The present invention relates to an improvement in axle clamps of a type especially designed for fixing to the axle of a vehicle the attachable part or end of a shock absorber, snubber, spring controller or device of a similar character.

The essential object of the invention is to enable the clamp to be securely fixed to the axle without bending or distortion of its attaching member. Hitherto in clamps of a similar character the tightening of the clamp onto the axle for securely fixing it has very often resulted in bending the bolt by which the attachment is made.

A further object of the invention is to provide whereby strain upon the clamp after its attachment to the axle may be more evenly distributed between its respective jaws than has hitherto been attained.

The invention can best be seen and understood by reference to the drawings, in which—

Fig. 3 is a plan of the clamp.

Fig. 4 is a front elevation of the inner end of one of the clamp members, and

Figure 1:
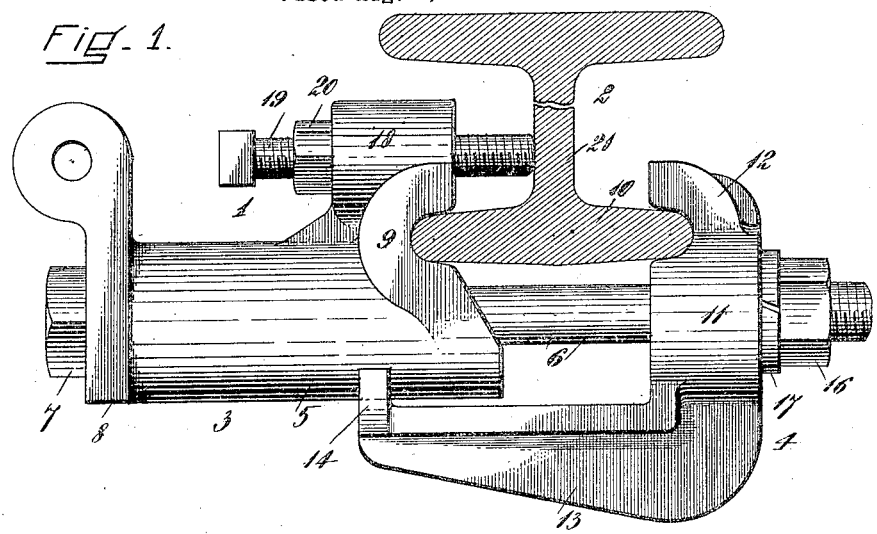
Figure 1 is a side elevation of the clamp attached to an axle, the axle being shown in cross section.
Figure 2:
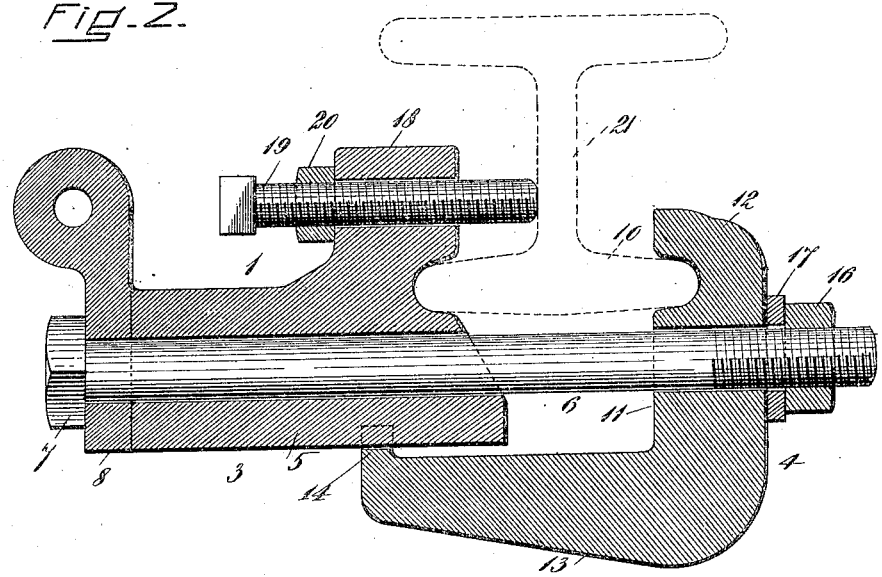
Fig. 2 is a longitudinal vertical section of the clamp.

Fig. 5 a like elevation of the other member.

Fig. 6 is a side elevation of a slightly modified structure.

1 represents the axle clamp, 2 the axle. The axle clamp comprises opposing spaced jaw-carrying members 3 and 4, respectively. Of these members the member 3 consists of an elongated body 5 preferably tubular in form. Extending through this body is a bolt 6, 7 representing the head of the bolt. Between the outer end of the body 5 and the head of the bolt, arranged upon the shank of the bolt, is an eye-piece 8 through which attachment is made to the clamp. At its inner end the body 5 carries a laterally offset jaw 9 which is one of the jaws securing the clamp to the flange 10 of the axle.

The clamp member 4 consists of a body 11 through which the shank of the bolt extends to project beyond the same. The body 11 carries a laterally offset jaw 12 engaging the axle flange 10 in position complementary to the jaw 9 of the clamp member 3. Projecting from the side of the body 11 opposite its jaw 12 is an arm 13. This arm extends in a general direction substantially parallel with the shank of the bolt to overlap the space between the two members and bear against the side of the body to the other member opposite its jaw 9 and be slidable thereon as the clamp members are moved toward or away from one another during the fixing or unfixing of the clamp in relation to the axle. The contact between the arm and said body is preferably obtained by providing the arm with an end bearing 14 presenting a rounding surface or edge 15 which conforms to the shape of the body and by which the bearing is maintained against lateral displacement.

That portion of the shank of the bolt projecting beyond the body of the clamp member 4 is provided with a tightening nut 16 and lock washer 17 by which means the two clamp members are brought together and the jaws thereof tightened onto the flange of the axle or released therefrom. During the tightening of the nut and fixing of the jaws, were it not for the arm 13, strain brought to bear upon the shank of the bolt and clamp member 4 would tend to bend or distort the shank and displace the clamp member 4, thereby weakening and disarranging the clamp. The arm 13 by its bearing against the body of the clamp member 3 prevents such distortion and disarrangement of parts.

With a clamp having a clamp member with an elongated body as above described I prefer that the clamp be provided with additional bearing against the axle, which has the effect of distributing and equalizing strain brought to bear upon the clamp after its attachment to the axle. When the clamp is in place on the axle, pull applied to the eye-piece 8 on the outer end of the clamp member 3 will exert influence to turn the clamp on the axle, the jaw 9 fulcruming on the flange 10 with a resulting effect tending to tip and thereby displace the jaw 12 in a direction away from the flange 10 of the axle. This effect is increased to a certain extent by the arm 13, but it is desirable to eliminate it in so far as possible. This is accomplished by changing the fulcrum and providing a fulcrum about midway between the two jaws. To this end the clamp member 3 is provided with a butt 18 located above the jaw 9. Arranged to turn in this butt is a set screw 19 held in adjusted position by a locking nut 20. Thus arranged the inner end of the set screw may, when the clamp has been fixed to the axle, be brought to bear against the body 21 of the axle at a point above and about midway between the jaws 9 and 12. The body of the axle then becomes the fulcrum on which the clamp tends to turn when pull is applied to the eye-piece 8 and resulting strains will be brought to bear upon the jaws of the clamp to force them against the axle flange along lines substantially at right angles to the longitudinal centre of the clamp and which strains accordingly have little or no influence to effect a separation of the jaws.

In Fig. 6 is shown an axle clamp in which the respective jaw-carrying members 22, 23, both have relatively short bodies through which the bolt 6 extends. In such a construction the tendency is to bend the bolt at a point about midway the jaws on tightening the nut 16 when the clamp is applied to the axle. By providing one of the members with an arm 22 on the side thereof opposite the jaw carried by said member, which arm overlaps the space between the members and bears against the other member, the difficulty is overcome. In such case the arm (carried by the member 22) by its bearing against the member 23 keeps the member 22 from turning and thereby assists in preventing bending of the bolt. At the same time the upward thrust of the arm against the member 23 serves to keep that member from turning. Accordingly by reason of the arm both members conjointly act to prevent bending of the bolt when the nut is tightened.

Having thus fully described my invention, I claim and desire to secure by Letters Patent of the United States:—

1. An axle clamp of the type specified comprising opposing spaced members, each member having a body with a laterally offset jaw, a bolt with tightening nut thereon connecting the bodies of said members and extending through the space between the jaws thereof, and an arm projecting from the body of one of said members on the side thereof opposite its jaw and overlapping the space between said members and bearing against the body of the other member on the side thereof opposite its jaw.

2. An axle clamp of the type specified comprising opposing spaced members, each member having a body with a laterally offset jaw, the body of one of said members being relatively longer than the body of the other member, a bolt with tightening nut thereon connecting the bodies of said members and extending through the space between the jaws thereof, and an arm carried by said member having the shorter body, said arm projecting from the body of the member on the side thereof opposite its jaw and overlapping the space between the members and bearing against the longer body of the other member on the side thereof opposite its jaw.

3. An axle clamp of the type specified comprising opposing spaced members, each member having a body with a laterally offset jaw, a bolt with tightening nut thereon connecting the bodies of the respective members and extending through the space between the jaws thereof, a set screw carried by and adjustable on one of said members, said screw being arranged beyond the jaw of said member and extending in a direction whereby the end of the screw may be brought into an engaging position above the space between said jaws, and an arm projecting from the body of one of said members on the side thereof opposite its jaw and overlapping the space between said members and bearing against the body of the other member on the side thereof opposite its jaw.

4. An axle clamp of the type specified comprising opposing spaced members, each member having a body with a laterally offset jaw, the body of one of said members being longer than the body of the other member with means for attachment at the outer end thereof, a bolt with tightening nut thereon connecting the bodies of said members and extending through the space between the jaws thereof, a set screw carried by and adjustable on the member having the longer body, said screw being arranged beyond the jaw of said member and extending in a direction whereby the end of the screw may be brought into an engaging position above and substantially midway the space between said jaws when the jaws are occupying an engaging position, and an arm on the member having the shorter body, said arm projecting from the shorter body on the side thereof opposite its jaw and overlapping the space between said members and bearing against the longer body of the other member on the side thereof opposite its jaw.

JAMES S. LANG.